April 24, 1951  J. H. MILLAR  2,550,583
FLEXIBLE HOSE COUPLING
Filed June 28, 1947  2 Sheets-Sheet 1
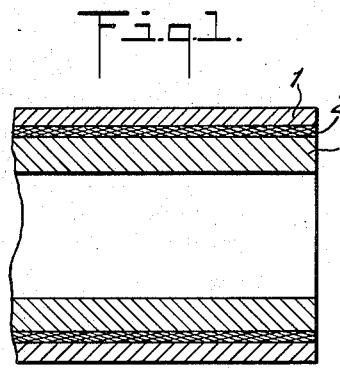
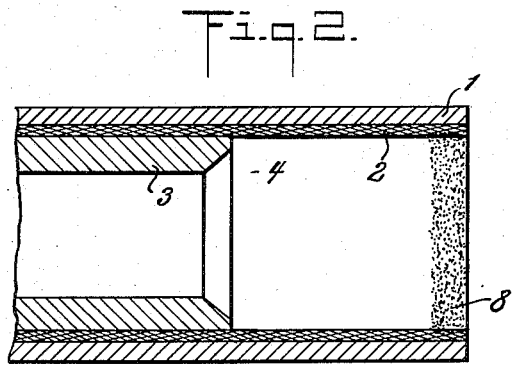
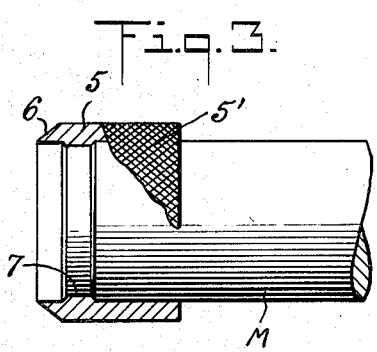
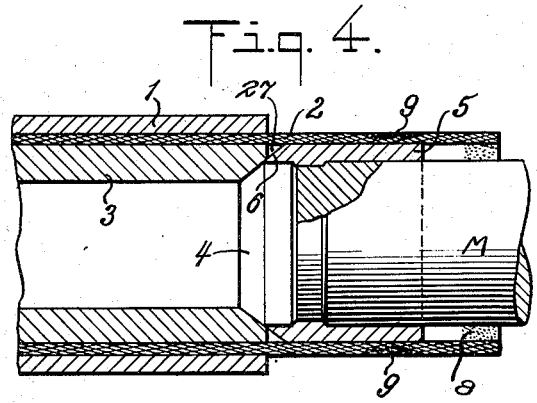
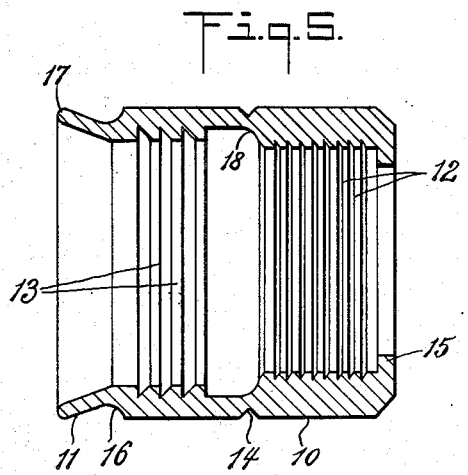
INVENTOR
JOHN H. MILLAR
BY Darby & Darby
ATTORNEYS April 24, 1951  J. H. MILLAR  2,550,583
FLEXIBLE HOSE COUPLING
Filed June 28, 1947  2 Sheets-Sheet 2

INVENTOR
JOHN H. MILLAR
BY
Darby & Darby
ATTORNEYS

Patented Apr. 24, 1951

2,550,583

UNITED STATES PATENT OFFICE 2,550,583

FLEXIBLE HOSE COUPLING

John H. Millar, Little Compton, R. I.

Application June 28, 1947, Serial No. 757,769

2 Claims. (Cl. 285—84)

This invention is a flexible hose coupling particularly adapted for use on high and very high pressure hose.

An important object of this invention is to provide an improved flexible hose coupling construction capable of withstanding the bursting pressure on high and very high pressure hose.

A further object of the invention is to provide a structure of this kind in which the coupling structure does not obstruct the bore of the hose wherefore a "full-flow" hose is provided.

A still further object of this invention is to provide a novel construction for attaching the coupling fixtures of a flexible hose to the hose in such manner as to prevent the coupling fixture from blowing off the end of the hose at any pressure within the bursting range of the hose, even at high temperatures.

Another object of this invention is to provide an improved method of assembling the coupling on a hose to attain the various objects recited above.

Other objects of the invention will be apparent from the following description of the embodiments thereof illustrated in the attached drawings and described in full detail below.

This invention resides substantially in the combination, construction, arrangement, relative location of parts, steps and series of steps, all as will be fully set forth hereinafter.

In the accompanying drawings—

Figure 1 is a vertical, central, longitudinal, cross sectional view through a short section of flexible hose of the type for which the coupling of this invention was devised;

Figure 2 is a similar view illustrating the first step in the process of assembling the coupling on the hose;

Figure 3 is a cross sectional view partly in elevation of the end load carrier mounted on the end of a mandril ready for insertion in the structure of Figure 2;

Figure 4 is a vertical, central, longitudinal, cross sectional view similar to that of Figure 2 showing further steps in the assembly process and particularly the end load carrier in place;

Figure 5 is a vertical, central, longitudinal, cross sectional view of the coupling ferrule;

Figure 6:
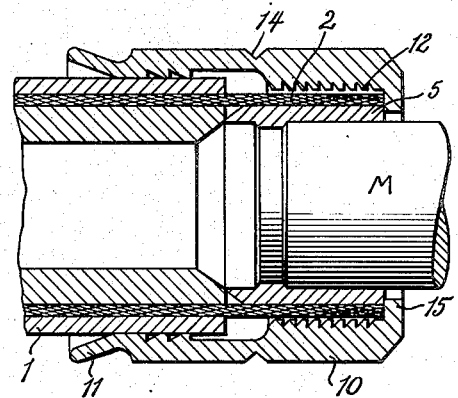
Figure 6 is a view similar to that of Figure 4 further along in the process showing the coupling ferrule applied over the end of the hose.

The test requirements for high and very high pressure reinforced flexible hose are very rigid. By high and very high pressure hose is meant hose that is capable of withstanding pressures of as much as 20,000 to 25,000 pounds pressure per square inch and more. Under normal working pressures hose of this type must be able to withstand a fire test temperature of 2000° F. for a minimum period of five minutes during which the hose is exposed to a flame of such temperature. The structure herein disclosed is capable of successfully passing tests of this nature.

High pressure hose couplings in general use have a bore restriction at the coupling substantially equal to the thickness of the spigot or insert. This is a very undesirable defect which has not heretofore been successfully avoided in high pressure hose couplings of this type. It is unnecessary to delineate the many disadvantages of restricting the bore of such hose as these are well understood by those skilled in this art.

A major point of weakness in high pressure hose couplings of this type is the tendency of the coupling to blow off the end of the hose before the hose bursts. The structure herein disclosed has been devised successfully to withstand the end thrust load which tends to cause the coupling to blow off the end of the hose. As will appear in more detail later, the coupling elements are assembled so as to effect a locking action between them and the reinforcing braiding of the hose.

A very important object of this invention is to provide a novel method of assembly of the parts comprising the invention to facilitate ease of assembly and uniformity of the resulting product by a procedure which is economical and adapted to rapid accomplishment.

An excellent understanding of the invention in relation to all of the objects thereof will be provided by describing the procedure for assembling the parts, interspersing where necessary a description of the structural parts.

The invention is most effectively applicable to flexible hose of the type comprising a carcass composed of inner and outer sleeves of rubber having interposed between them one or more layers composed of a woven wire reinforcement of high tensile strength steel wire. At this point it may be noted as will be understood, that the subject matter of this invention is also applicable to lower pressure hose in which case the carcass is sometimes reinforced with a similar reinforcement of cotton or rayon braid and the like. It is hardly necessary to note that the inner and outer tubes are made either of natural rubber, synthetic rubber or mixtures thereof as well as other plastic materials and that the novel structure herein disclosed is not limited by the nature of the flexible material comprising the inner and outer tubes of the hose.

Such a hose is diagrammatically illustrated in Figure 1 and comprises a carcass composed of the outer flexible tube 1, the inner flexible tube 3 and the flexible woven steel reinforcing braid 2. These parts are commonly assembled under heat and pressure so as to form a unitary structure. As illustrated in Figure 1, the terminal end of such a hose to which a coupling is to be applied is squared off. The inner tube 3 is then removed in any suitable manner for a sufficient distance inwardly from the squared end of the hose. The end of the inner tube 3 resulting from this operation may be beveled as shown at 4.

The end load carrier 5, see Figure 3, consists of a sleeve of suitable metal depending upon the operating conditions to be encountered such as, for example, steel, brass, aluminum alloy or Phosphor bronze. The end load carrier is cylindrical in its outer conformation and is provided with a squared outer end and a beveled end 6. The outer cylindrical surface is knurled or otherwise roughened as indicated at 5'. Near the beveled end of the end load carrier is an internal radial projection 7 forming an annulus. As illustrated in Figure 3, the end load carrier is slipped, from its squared end, onto the end of a polished and hardened mandril M so that the shoulder of the mandril M abuts against the adjacent periphery of the annulus 7. The inner cylindrical surface of the exposed reinforcement 2 is soldered as indicated at 8 so as to hold the loose ends of the strands comprising the braid in original position. The end load carrier is then inserted in the end of the hose by means of the mandril M so that its beveled edge 6 seats on the beveled end of the innerlining 3 as illustrated in Figure 4. The outer covering 1 is then removed and the outer surface of the reinforcement is soldered as indicated at 9, to further aid in holding the braid strands in place. Those skilled in the art will readily understand that, in the case of a steel wire reinforcement, the wire forming the braid is extremely springy and the cut ends will tend to spring or fan out when the tubes 1 and 2 are removed and for this reason soldering is desirable. The tubes 1 and 2 are cut off a little further back than is required so that the soldered end of the reinforcement 2 can be cut off at the proper time. It is also preferable to provide the solder 9 at a point within the end of the end load carrier 5 and the solder 8 at a point outside of it so that when the excess braid is cut away the end load carrier will prevent the braid ends from springing inwardly and the solder 9 will prevent them from springing outwardly. All of these features are illustrated in Figure 4.

At this point an alternative method of procedure will be explained. In this case the outer tube 1 is first stripped off rather than the inner tube. A split ring is then placed over the end of the bared wire braid reinforcement to prevent it from springing outwardly. This split ring is left on the braid and the outer ferrule is modified to receive it in a manner to be explained later. The inner tube 3 is then cut away as in the first method and the end load carrier 5 is then slipped into place so that the structure will be like that of Figure 4 except that the split ring will surround the plate in the region of the solder 9. In this case the tubes 1 and 3 need only be cut back so that only the required amount of braid is exposed and no soldering is required. In either method, when the operations up to this point are complete, the reinforcement 2 will terminate at the squared or outer end of the end load carrier 5.

The outer ferrule 10 is shown in Figure 5. This ferrule can be made of any suitable material such as brass, aluminum alloy, low carbon steel, or Phosphor bronze. It is circular in form and at one end is provided with an internal radial flange 15 having a central opening and at the other end with a flare 11 which joins the main body of the ferrule so as to provide an annular groove 16. The free edge of the flare is rounded as shown at 17 and it will be seen that the flared portion converges to the internal diameter of the ferrule. The main body of the ferrule is provided with an external peripheral groove 14. The inside of the ferrule is provided with an annular recess or groove on the interior in about the plane of the groove 14. To the right of the recess 18 the internal bore of the ferrule is of somewhat reduced diameter and the annular surface thereof is provided with a series of flat-topped teeth 12. To the other side of the recess 18 the annular inner surface of somewhat enlarged diameter is provided with teeth 13. The teeth 12 and 13 are in the form of annular ridges. As shown in Figure 6, the ferrule 10 is now slipped over the end of the structure of Figure 4 (the waste end of the braid 2 having been removed) so that the parts appear as illustrated in Figure 6.

Figure 7:
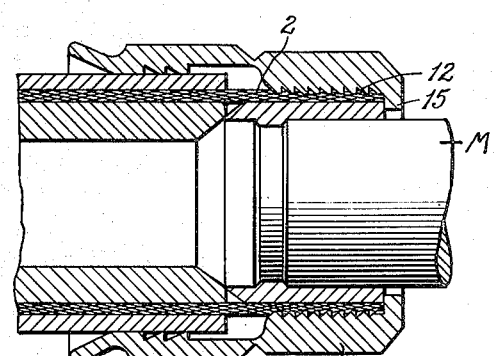
Figure 7 is a view similar to Figure 6 showing the next step in the process wherein the outer end of the ferrule has been compressed radially to grip the reinforcing braid of the hose between it and the end load carrier.

The flared end 11 of the ferrule aids in slipping it over the end of the hose. The ferrule is applied as illustrated in Figure 6 until the end of the braid and the inserted end load carrier 5 abut against the inner face of the flange 15. The structure is then placed in suitable shaped radially movable dies to provide a radial pressure in all directions to the exterior of the ferrule 5 on that portion thereof to the right of groove 14. The diameter of the ferrule is then reduced by the application of sufficient pressure through the dies so that the teeth 12 are forced down into intimate contact with the exterior of the reinforcing braid 2 and in turn this braid is forced down into intimate contact with the knurled outer surface of the end load carrier 5. The pressure exerted is sufficient to contract the ferrule to such an extent that it is positively distorted and takes a permanent set. As a result the wire braid is powerfully attached to the end load carrier 5 as it is gripped between it and the teeth 12 of the ferrule. This condition is diagrammatically illustrated in Figure 7. For all intents and purposes the end load carrier is permanently united as though in one piece and interlocked with the braid. During this deforming operation the mandril end remains within the end load carrier 5 so as to back it up and prevent its deformation. It is important to note that during the operation of attaching the end load carrier, ferrule and braid together that portion of the ferrule to the left of groove 14 has not been disturbed. The mandril M is now withdrawn.

Figure 8:
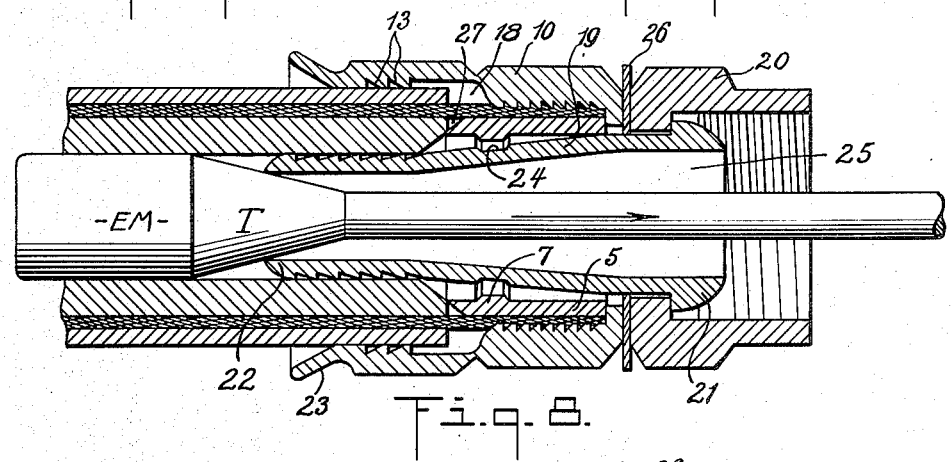
Figure 8 shows the next step of the process in which the spigot or insert has been positioned in the hose with a coupling fixture or union member attached and an expanding mandril properly positioned.

The spigot or insert 19 is now slipped into the swivel or union nut 20 so that its shouldered end 21 rests on the flange of the nut as shown in Figure 8. The end 21 of the insert is formed with a seating surface to form a coupling member for cooperation with a mating part to form a seal when the nut 9 is drawn up tight, all as is well understood in the art. This seating form can take various forms other than the specific form shown in the drawings. An expanding mandril EM is then inserted so that its tapered portion T lies in the mouth of the smaller end 22 of the insert. The outer surface of the smaller end of the insert is provided exteriorly with an annular groove 24 positioned to be axially aligned with the annular ring 7 on the inner surface of the end load carrier 5 when the parts are assembled, all as clearly shown in Figure 8.

The larger diameter of the mandril EM is slightly larger than the nominal inside diameter of the hose, for example, about 0.005 of an inch larger, and the inside diameter of the larger end, in the region 25, of the insert 19 is about 0.0010 to 0.0012 of an inch larger than the nominal inside diameter of the hose. A distance piece 26 in the form of a thin split ring is passed over the insert 19 so that it will lie between the adjacent ends of the ferrule 10 and the nut 20 when these parts are assembled in the relation shown in Figure 8. This distance piece will serve the important function of aligning the groove 24 with the ridge 27 as well as an additional function to be referred to later. These parts, that is the nut 20, the ring 26, the insert 19 and the mandril EM are then pushed into the hose in the position shown in Figure 8 with the small rod-like extension projecting exteriorly of the structure, as shown. At this time, the nut 20 is abutting the ring 26 which in turn contacts the end face of the ferrule 10 and the insert 19 is seated at its shouldered end 21 on the inner face of the flange of the nut 20. This structure is then placed in a suitable fixture in which the end 21 of the insert rests on a rigid fixed seat.

Figure 9:
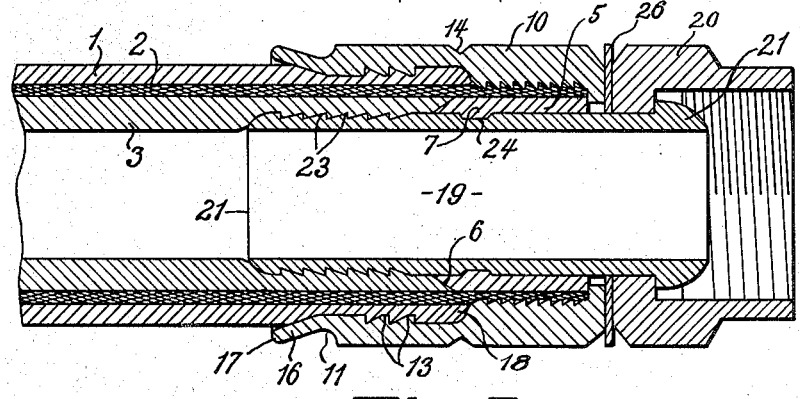
Figure 9 is a vertical, central, longitudinal, cross sectional view through the finished structure after the spigot or insert has been expanded.

The small end of the expanding mandril EM is gripped by a suitable pulling mechanism so that the mandril can be pulled through the insert 19, that is, from left to right in Figure 8. As the tapered portion T of the mandril engages the small end 22 of the insert it will be seen that if a sufficient pulling force is applied that the insert 19 will be expanded to the full diameter of the lefthand end of the expanding mandril EM as it is pulled through the insert. In one suitable form of mechanism this relative movement between the hose and coupling structure and the mandril is effected by applying a force to the end 21 of the insert 19 which causes the hose and coupling to move to the left. In other words, it is preferred to grip the small end of the mandril in a suitable vice and hold it stationary. As the insert 19 is expanded by the mandril, it will be seen that the internal radial projection 7, forming an internal annulus on the end load carrier 5, will be interlocked with the peripheral annular groove 24 of the insert 19, as the insert assumes the full diameter, as clearly shown in Figure 9. As the insert is expanded the rubber or other material of the inner layer 3 of the hose is caused to flow into the space 27, see Figure 8, so that a seal is formed with the tapered end of the end load carrier 5, see Figure 9. At the same time, the teeth 23 of the insert are buried in the inner layer 3 and the internal diameter of the insert 19 of course becomes the same as the internal diameter of the hose. Thus, there is substantially no projection at the end 21 of the insert, one of the objects of this invention.

As the hose and coupling are moved to the left in this mechanism and at the proper time the portion of the ferrule 10 to the left of the groove 14 first enters the mouth of a split reducing die which causes that end of the ferrule to be contracted down upon the outer portion 1 of the hose, forcing the teeth 13 thereof to be buried therein and causing the end of the covering 1 to flow somewhat into the space 28 of the ferrule. At this time the full diameter portion of the expanding mandril EM can be of such length as to back up the insert 19 so as to prevent it from being distorted. This may not be necessary since this outer portion of the ferrule is only given a light swage to force it into position. This swaging operation is favored by the annular groove 14 which to some extent divides the body of the ferrule into two separate portions which can thus be individually contracted as is now apparent. These operations are continued until the mandril is completely withdrawn from the hose whereupon on removal of the split distance washer 26 the operations forming part of this invention are complete.

In review it will be seen that the reinforcing braid or layer 2 is powerfully gripped at its exposed end between the heavy portion of the ferrule 10 and the sleeve or end load carrier 5. These three parts are all properly relatively positioned by reason of the fact that the flange 15 of the ferrule abuts against the end of the layer 2 of the end load carrier 5. The insert 19 is axially locked to the end load carrier 5 and a fluid tight seal has been effected at the beveled edge 6 of the end load carrier. The outer layer 1 is gripped in the teeth 13 of the ferrule and has flowed into space 28 and the inner layer 15 is gripped in the teeth 23 of the insert 19. The nut 20 is free on the insert so that it can be used for its intended coupling purposes. At this point it may be noted that in some forms of structure in which this invention may be used nut 20 may be omitted and the end 21 of the insert may have the form shown or some other suitable configuration.

As a minor variation, it should be noted that it is not necessary to use a ferrule having a flange 15. In some cases, in order to shorten the coupling and reduce weight, the flanged end can be omitted, in which case the parts may be relatively positioned prior to attachment by suitably shaping the end load carrier mandril.

By reason of the metallic union of the metal reinforcing braiding with the end load carrier, electrical bonding is achieved between the two, which electrical bonding is automatically transferred also to the spigot or insert which is interlocked with the end load carrier as hereinbefore described.

Another advantage of the combination comprising this invention results by first attaching the metal reinforcing braiding to the end load carrier. The flow of the hose material itself when the body and rear part of the ferrule are later contracted upon it must take place relative to the braiding and thereby elongation of the hose during manufacture of the assembly is substantially eliminated.

The flared end 16 of the ferrule provides a relief for the outer wall of the hose and permits it to flex freely with respect to the coupling structure. The annular groove 11 serves to strengthen the skirt portion of the ferrule and prevents its from opening out under abnormal pressures such as would occur if the coupling were subjected to great heat while under pressure. The rounded end edge 17 of the skirt insures against cutting or damaging the outer layer 1 of the hose when it is flexed.

In the alternative procedure at the start of the process, it was suggested that a split ring might encircle the exposed braid at the end to prevent it from opening up. This ring after it is applied may remain as applied since it will be employed at a point where it will lie in an annular recess which would be formed at the flanged end of the ferrule provided for the purpose of accommodating it. This ring will thus be incorporated in the finished structure.

From the above description it will be apparent to those skilled in this art that the structural details and sequence of steps are capable of some variation without departure from the scope of novel subject matter herein disclosed. I do not therefore desire to be strictly limited to the illustrated disclosure herein set out but only as required by the claims granted me.

What is claimed is:

1. The combination with a flexible rubber hose having at least one metallic reinforcing layer bared on both sides at the end, of a coupling comprising a spigot within the hose end portion, a soft metallic ring disposed in a groove around the outside of the spigot and within the bared end of the reinforcing layer, and a ferrule surrounding the hose end so disposed that said bared end of the reinforcing layer is directly gripped between said ferrule and said ring with sufficient force to interlockingly engage said reinforcing layer with said ring, with an unbared portion of the hose gripped between said ferrule and said spigot.

2. In the combination of claim 1, said ferrule having internal teeth forming said gripping contact with said reinforcing layer.

JOHN H. MILLAR.

REFERENCES CITED

The following references are of record in the file of this patent:

UNITED STATES PATENTS

| Number | Name | Date |
| --- | --- | --- |
| 1,969,203 | Cadden et al. | Aug. 7, 1934 |
| 2,025,427 | Weatherhead, Jr. | Dec. 24, 1935 |
| 2,228,018 | Scholtes | Jan. 7, 1941 |
| 2,248,576 | McConnohie | July 8, 1941 |
| 2,321,991 | Butler | June 15, 1943 |
| 2,333,349 | Weatherhead, Jr., et al. | Nov. 2, 1943 |
| 2,374,226 | Melsom | Apr. 24, 1945 |
| 2,399,790 | Conroy | May 7, 1946 |